United States Patent
Conti et al.

(10) Patent No.: US 7,809,934 B2
(45) Date of Patent: Oct. 5, 2010

(54) SECURITY MEASURES FOR PREVENTING ATTACKS THAT USE TEST MECHANISMS

(75) Inventors: Gregory R. Conti, Saint Paul (FR); Pascal Cussonneau, Antibes (FR); Benoit Drevet, Nice (FR); Vincent Chalendard, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 756 days.

(21) Appl. No.: 11/741,181

(22) Filed: Apr. 27, 2007

(65) Prior Publication Data

US 2008/0091930 A1    Apr. 17, 2008

(30) Foreign Application Priority Data

Oct. 13, 2006    (EP) .................................. 06291614

(51) Int. Cl.
G06F 9/00 (2006.01)
G06F 12/14 (2006.01)

(52) U.S. Cl. ................. 713/1; 726/22; 726/23

(58) Field of Classification Search ............ 713/1, 713/2
See application file for complete search history.

(56) References Cited

U.S. PATENT DOCUMENTS

| | | | | |
|---|---|---|---|---|
| 5,557,743 | A * | 9/1996 | Pombo et al. ........... | 726/23 |
| 5,935,266 | A * | 8/1999 | Thurnhofer et al. ....... | 714/726 |
| 7,036,023 | B2 * | 4/2006 | Fries et al. ............ | 726/21 |
| 7,120,771 | B2 * | 10/2006 | Dahan et al. ........... | 711/163 |
| 7,131,004 | B1 * | 10/2006 | Lyle ................... | 713/169 |
| 7,343,496 | B1 * | 3/2008 | Hsiang et al. .......... | 713/194 |
| 2004/0181682 | A1 * | 9/2004 | Orino et al. ............ | 713/200 |

* cited by examiner

*Primary Examiner*—Suresh K Suryawanshi
(74) *Attorney, Agent, or Firm*—Ronald O. Neerings; Wade James Brady, III; Frederick J. Telecky, Jr.

(57) ABSTRACT

A system comprising processing logic adapted to determine a type of boot performed by the system and a storage coupled to the processing logic. The processing logic is configured to erase or invalidate a predetermined portion of the storage, and to activate or deactivate an interface by which the system is accessed, if the type of boot comprises a functional boot.

20 Claims, 3 Drawing Sheets

SECURITY MEASURES FOR PREVENTING ATTACKS THAT USE TEST MECHANISMS

CROSS-REFERENCE TO RELATED APPLICATION

The present application claims priority to EP Application No. 06291614.3, filed on Oct. 13, 2006, hereby incorporated herein by reference.

BACKGROUND

Various electronic devices, such as mobile communication devices, are capable of operating in various modes. Such modes may include, for example, a "test" mode and a "functional" mode. The test mode is primarily used to test the electronic device when it is being manufactured. After manufacture is complete, the electronic device generally operates in the functional mode, also commonly known as the "normal" mode. In some cases, a malicious entity (e.g., a hacker) may exploit the test and/or functional modes to launch an attack on (e.g., access confidential information from) the electronic device. Preventative measures are desired.

SUMMARY

Accordingly, there are disclosed herein various embodiments of a system comprising processing logic adapted to determine a type of boot performed by the system and a storage coupled to the processing logic. The processing logic is configured to erase or invalidate a predetermined portion of the storage, and to activate or deactivate an interface by which the system is accessed, if the type of boot comprises a functional boot.

Some embodiments comprise a method implemented in a system, the method comprising determining a type of boot performed by the system and, if the type of boot comprises a functional boot, erasing or invalidating a predetermined portion of a system storage and activating or deactivating an interface by which the system is accessed.

Some embodiments comprise a system comprising means for determining a type of boot performed by the system and means for erasing or invalidating a predetermined portion of a system storage if the type of boot comprises a functional boot. The means for erasing or invalidating is also for activating or deactivating an interface by which the system is accessed if the type of boot comprises a functional boot.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

For purposes of this disclosure, a "functional boot" may be defined as a boot mode in which processing logic is able to fetch and execute instructions without restriction. This boot mode may be used to run any software, such as a high-level operating system. A "trash boot" may be defined as a boot mode in which processing logic is prevented from starting a regularly-scheduled activity using one or more hardware or software mechanisms (e.g., a trap or a loop) that prevents the program counter of the processing logic from incrementing and prevents the execution of instructions. This boot mode is used to prevent the execution of software when various test modes are entered.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Described herein are various techniques by which an electronic device is protected from malicious attacks that are launched using the device's test and functional modes. In particular, the disclosed techniques comprise manipulating specific signals produced by hardware logic and programming software to perform specific actions in response to various methods by which the electronic device may be booted. An illustrative system architecture is described first, followed by a description of various hardware techniques used to deter malicious attacks, followed by a description of various software techniques used to deter such malicious attacks.

Figure 1:
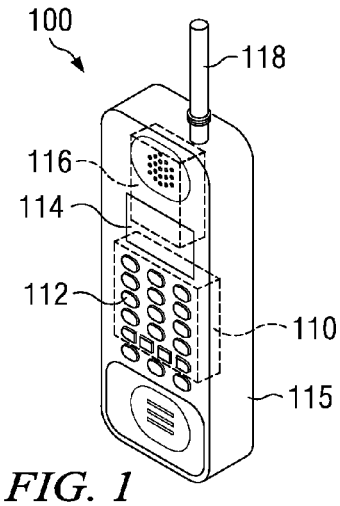
FIG. 1 shows an illustrative mobile communication device implementing the security techniques described herein in accordance with embodiments of the invention.

FIG. 1 shows an illustrative mobile communication device 100. The device 100 comprises a battery-operated device which includes an integrated keypad 112 and display 114. The device 100 also includes an electronics package 110 coupled to the keypad 112, display 114, and radio frequency ("RF") circuitry 116. The electronics package 110 contains various electronic components used by the device 100, including processing logic, storage logic, etc. The RF circuitry 116 may couple to an antenna 118 by which data transmissions are sent and received. Although the mobile communication device 100 is represented as a mobile phone in FIG. 1, the scope of disclosure is not limited to mobile phones and also may include personal digital assistants (e.g., BLACKBERRY® or PALM® devices), multi-purpose audio devices (e.g., APPLE® iPHONE® devices), portable computers or any other suitable electronic device.

Figure 2:
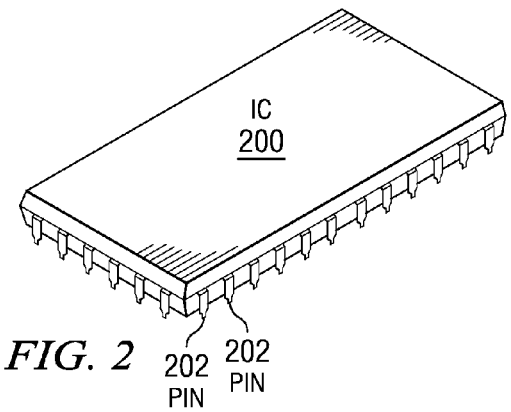
FIG. 2 shows an illustrative integrated circuit (IC) housed within the mobile communication device of FIG. 1, the IC implementing various security techniques described herein in accordance with embodiments of the invention.

As explained, the electronics package 110 comprises various circuit logic. The circuit logic includes an integrated circuit (IC) 200 as shown in FIG. 2. The IC 200 preferably is mounted on a printed circuit board (PCB, not shown) such as a motherboard of the mobile communication device 100. The IC 200 couples to the PCB using a plurality of conductive pins 202 which transfer electrical signals between the PCB and the IC 200.

Figure 3:
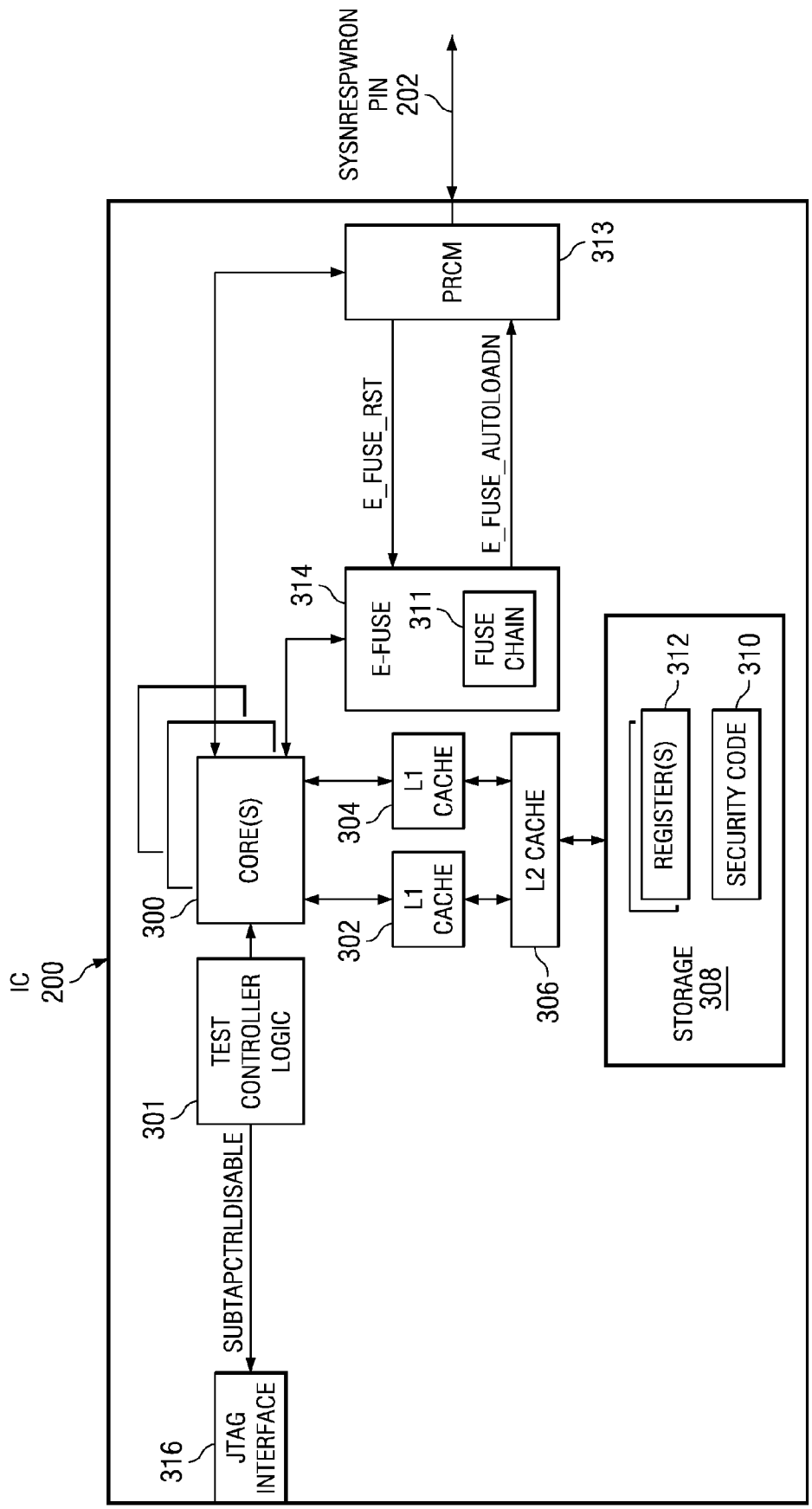
FIG. 3 shows a block diagram of the IC of FIG. 2, in accordance with embodiments of the invention.

In at least some embodiments, the IC 200 comprises a system-on-chip (SoC). Specifically, as shown in FIG. 3, the IC 200 comprises one or more processing cores 300 (e.g., an ARM® core, a digital signal processing (DSP) core, a JAVA® processing core), multiple L1 first-level caches 302 (e.g., an instruction cache) and 304 (e.g., a data cache) coupled to the core(s) 300, an L2 second-level cache 306 coupled to the L1 caches 302, 304, and a storage (e.g., one or more memories) 308 coupled to the L2 cache. The storage 308 preferably comprises security code 310 and a plurality of registers 312, including an ARM_BOOT_BRANCH register, described below. The IC 200 also may comprise a power reset control manager (PRCM) 313, an electronic fuse (e-fuse) module 314, one or more Joint Test Action Group (JTAG) interfaces 316 and a test controller logic 301.

The PRCM 313 is used to reset the IC 200 and/or the device 100. The PRCM 313 causes a reset to occur by adjusting a signal on a pin 202 coupled to the PRCM 313. This particular pin is referred to as the NRESPWRON pin. When stimulated (e.g., set "HIGH" or, in other embodiments, set "LOW") by the PRCM 313, the NRESPWRON pin causes a cold reset of the IC 200 and, in some embodiments, the device 100 to be performed.

Upon a cold reset of the IC 200 and/or the device 100, portions of the IC 200 may require configuration. Accordingly, the e-fuse module 314 loads a chip configuration (e.g., various chip settings) onto the IC 200. The e-fuse module 314 stores chip configuration information in an e-fuse chain 311. The e-fuse chain 311 comprises one or more e-fuse cells coupled in series or in arrays. An e-fuse cell comprises a circuit element which has a natural, un-programmed state, but may be programmed to the opposite state. An e-fuse cell includes an e-fuse along with its programming and sensing circuits. A detailed description of e-fuses is provided in commonly-assigned U.S. Pat. No. 7,158,902, incorporated herein by reference.

The PRCM 313 provides a signal e_fuse_rst to the e-fuse module 314. The status of the signal e_fuse_rst also enables the PRCM 313 to reset the fuse chain 311, thereby erasing the fuse chain's values. The e-fuse module 314 provides a signal e_fuse_AUTOLOADN to the PRCM 313. The signal e_fuse_AUTOLOADN comprises a status signal which indicates when the fuse chain is fully loaded.

The JTAG interfaces 316 enable the IC 200 to communicate with an electronic device(s) external to the device 100, such as a computer used to test the IC 200, using JTAG protocol. When enabled, the JTAG interfaces 316 enable the external electronic device to obtain various types of information from the IC 200. If the JTAG interfaces 316 are disabled, the external electronic device is unable to communicate with the IC 200 via the JTAG interfaces 316. The JTAG interfaces 316 are enabled and disabled by a signal SUBTAPCTRLDISABLE, which is generated by the test controller logic 301.

The test controller logic 301 is communicably coupled to the core(s) 300, thereby enabling the core(s) 300 to cause the logic 301 to enable or disable the JTAG interfaces 316.

For security reasons, most processors provide two levels of operating privilege: a lower level of privilege for user programs; and a higher level of privilege for use by the operating system. The higher level of privilege may or may not provide adequate security for m-commerce and e-commerce, however, given that this higher level relies on proper operation of operating systems with vulnerabilities that may be publicized. In order to address security concerns, some mobile equipment manufacturers implement another level of security, or secure mode, that places less reliance on corruptible operating system programs, and more reliance on hardware-based monitoring and control of the secure mode. U.S. Patent Publication No. 2003/0140245, entitled "Secure Mode for Processors Supporting MMU and Interrupts," incorporated herein by reference, describes a hardware-monitored secure mode for processors. Thus, there are disclosed both secure and non-secure modes, and each of the secure and non-secure modes in turn comprises a privileged mode and a user (or non-privileged) mode.

Each of the secure and non-secure modes may be partitioned into "user" and "privileged" modes. Programs that interact directly with an end-user, such as a web browser, are executed in the user mode. Programs that do not interact directly with an end-user, such as the operating system (OS), are executed in the privileged mode. By partitioning the secure and non-secure modes in this fashion, a total of four modes are made available. In order of ascending security level, these four modes include the non-secure user mode, the non-secure privileged mode, the secure user mode and the secure privileged mode. There is an intermediate monitor mode, described further below, between the non-secure privileged mode and the secure privileged mode. The computer system 100 may operate in any one of these five modes at a time.

Figure 4:
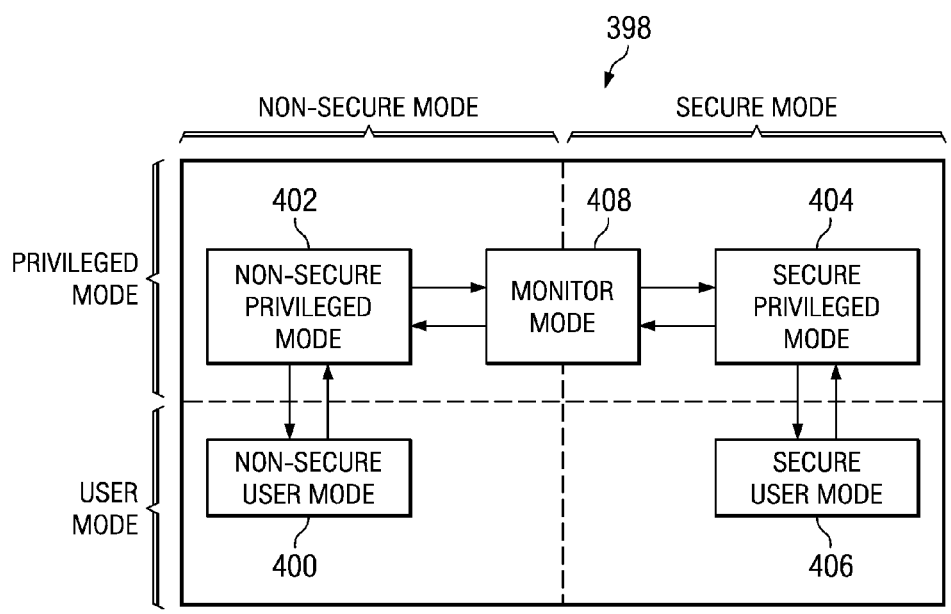
FIG. 4 shows various security modes used by the IC of FIGS. 2 and 3, in accordance with embodiments of the invention.

The computer system 100 may switch from one mode to another. FIG. 4 illustrates a preferred mode-switching sequence 398. The sequence 398 is preferred because it is more secure than other possible switching sequences. For example, to switch from the non-secure user mode 400 to the secure privileged mode 404, the system 100 should first pass through non-secure privileged mode 402 and the monitor mode 408. Likewise, to pass from the secure user mode 406 to the non-secure user mode 400, the system 100 should switch from the secure user mode 406 to the secure privileged mode 404, from the secure privileged mode 404 to the monitor mode 408, from the monitor mode 408 to the non-secure privileged mode 402, and from the non-secure privileged mode 402 to the non-secure user mode 400. Further information on these security modes is available in commonly-owned, co-pending U.S. application Ser. No. 11/343,061, filed Jan. 30, 2006, and incorporated herein by reference.

In addition to these security modes, the IC 200 operates in multiple operational modes. Specifically, during manufacture, the IC 200 may be tested to ensure functional integrity. Although various testing techniques are available, a "scan test" is often performed. In such a scan test, a string of input values is shifted through the IC 200, resulting in a string of output values. The output values are then compared to expected output values. If the output values match the expected output values, the IC 200 is determined to be functioning properly. However, if the output values do not match the expected output values, the IC 200 is determined to be functioning improperly. The IC 200 preferably is tested using a scan test while the IC 200 is in a "test mode." After the IC 200 has passed inspection, the IC 200 is taken out of the "test mode" and is set to the "functional mode." However, even though testing is complete, it is still possible to switch from the functional mode back to the test mode and from the test mode to the functional mode.

As previously explained, various hardware and software security techniques may be implemented to prevent malicious attacks that attempt to take advantage of weaknesses in the various security and operational mode schemes described above. At least some implementations of these hardware security techniques are now described, followed by descriptions of at least some implementations of the software techniques. The various hardware and software security measures may be implemented independently or, alternatively, one or more of the hardware and/or software security measures may be implemented in combination.

Referring again to FIG. 3, in some embodiments, it may be desirable to prevent test mode switches (e.g., switches between test mode and functional mode, switches between different test modes), because malicious entities may be able to obtain sensitive information in one mode and use the information maliciously in another mode. Accordingly, to prevent such test mode switches, the PRCM 313 of the IC 200 may set the SYSNRESPWRON pin 202 of the IC 200 to "0," or "LOW." By setting the SYSNRESPWRON pin LOW, the IC 200 is subjected to a cold reset, thereby preventing a malicious attack from taking place and preventing a malicious entity from improperly accessing secure data via the test mode. More specifically, the default mode of the system 100 preferably is the functional mode. The system 100 may be switched from the functional mode to the test mode via a JTAG command received via the JTAG interfaces 316. When such a JTAG command is received, the PRCM 313 is provided with a reset order. The PRCM 313 grants the reset order by setting the SYSNRESPOWERON pin 202 LOW. Thus, the IC 200 is reset, and no secure information remains in the caches, RAM, etc. for a malicious entity to exploit. A test mode switch then may be performed.

In preferred embodiments, the IC 200 is not reset every time a test-mode switch JTAG command is received. Instead, the IC 200 preferably is programmed to reset itself in this way during specific, predetermined time intervals. Thus, while a JTAG command requiring a test-mode switch may cause an IC 200 reset if received during such a time interval, a similar JTAG command received outside of such an interval may fail to trigger an IC 200 reset. Furthermore, in some embodiments, the IC 200 may be reset by setting the SYSNRESPWRON pin 202 to "1," or "HIGH." Further still, not all embodiments which fall within the scope of this disclosure require the IC 200 to be reset using the SYSNRESPWRON pin 202. Various embodiments may include resetting the IC 200 using any suitable mechanism.

In at least some embodiments, when only one test mode switch is permitted, the AUTOLOADN signal may be set to "0" or "LOW" by the e-fuse module 314 and the SYSNRESPWRON pin 202 may be set to "1" or "HIGH" by the PRCM 313. By setting the AUTOLOADN signal and the SYSNRESPWRON pin as such, only one test mode switch is possible. By making only one test mode switch possible, malicious entities are prevented from taking information obtained in one mode and using that information maliciously in another mode. For example, a malicious entity may use a scan test mode to store sensitive information on the IC 200, and then may switch to a different test mode to boot with this information, thereby launching a security attack on the IC 200. By making only one test mode switch possible, this illustrative attack (and other similar attacks) are deterred or even prevented.

Not all embodiments which fall within the scope of this disclosure require that the AUTOLOADN signal by set to "0" or "LOW" and that the SYSNRESPWRON pin 202 be set to "1" or "HIGH." In at least some embodiments, the AUTOLOADN signal may be set to "1" or "HIGH," and in the same or different embodiments, the SYSNRESPWRON pin 202 may be set to "0" or "LOW." Furthermore, if the AUTOLOADN signal is not available, any suitable mechanism may be used in its place. For example, instead of adjusting the AUTOLOADN signal, any mechanism which indicates the status of an e-fuse module may be adjusted. Similarly, instead of adjusting the SYSNRESPWRON pin 202, any mechanism which is used to reset the an IC may be adjusted.

In some embodiments, when it is necessary to prevent any test mode switches, the e-fuse module 314 may set the AUTOLOADN signal to "1," or "HIGH." This hardware setting prevents any test mode switches from taking place. Specifically, once the fuse chain of the e-fuse 314 is fully loaded and AUTOLOADN is "1" or "HIGH," the test controller logic 301 sets SUBTAPCTRLDSIABLE to "1" or "HIGH" to disable the JTAG interfaces 316 and to prevent the IC 200 from receiving additional test mode switch requests via the JTAG interfaces 316. As explained above, in some embodiments, any mechanism which indicates a status of an e-fuse may be substituted for the AUTOLOADN signal, and in some embodiments, any mechanism which is usable to enable or disable a JTAG interface may be substituted for the SUBTAPCTRLDISABLE signal. Further, in at least some embodiments, instead of setting AUTOLOADN to "HIGH," AUTOLOADN may be set to "LOW," and instead of setting SUBTAPCTRLDISABLE to "HIGH," SUBTAPCTRLDISABLE may be set to "LOW."

In some embodiments, the SUBTAPCTRLDISABLE signal, generated by the test controller logic 301, is set to "1" or "HIGH" each time the IC 200 boots up or is reset. By setting the SUBTAPCTRLDISABLE signal "HIGH," the JTAG interfaces 316 are disabled and thus attempts by entities external to the device 100 to access the contents of the IC 200 via the JTAG interfaces 316 are blocked. Once the IC 200 has finished booting up, the SUBTAPCTRLDISABLE signal may be returned to "0" or "LOW," as desired. By returning SUBTAPCTRLDISABLE to "LOW," the JTAG interfaces 316 may again be used to access the IC 200. As previously described, in some embodiments, any suitable mechanism by which a JTAG interface is enabled or disabled may be substituted for the SUBTAPCTRLDISABLE signal. Further, instead of setting SUBTAPCTRLDISABLE "HIGH" and then "LOW," in some embodiments, SUBTAPCTRLDISABLE may first be set "LOW" and then "HIGH." Software security techniques in accordance with various embodiments are now described.

The software security techniques described below preferably are implemented by security code 310 stored in the storage 308 (e.g., a read-only memory (ROM) component of the storage). Preferably, a software security technique is selected from among those below in accordance with the type of boot-up process the IC 200 is undergoing or has undergone. More specifically, the ARM_BOOT_BRANCH register 312 described above indicates the type of boot-up process the IC 200 is undergoing at a specific time. In at least some embodiments, the security code 310 causes the core 300 to determine the contents of the ARM_BOOT_BRANCH register 312 at boot time (or, in other embodiments, just after boot time) and to select one or more of the following software security techniques accordingly.

The contents of the ARM_BOOT_BRANCH register may be adjusted by any suitable entity. For example, in some embodiments, software known as Test Description Language software (not specifically shown) may be executed to program the ARM_BOOT_BRANCH register with contents that indicate the type of boot the IC 200 is undergoing. The Test Description Language software preferably is stored on a test computer used to test the IC 200 and uses the JTAG interface to program the ARM_BOOT_BRANCH register. In some embodiments, if the IC 200 is undergoing (or has undergone) a "normal" boot, the ARM_BOOT_BRANCH register 312 contains a "0x0" value or some other value which the security code 310 recognizes as indicative of a normal boot. A "normal" boot may be defined as any suitable, functional, applicative boot. Accordingly, the security code 310 may cause the core 300 to erase at least a portion of the storage 308. For example, the core 300 may erase the contents of a predetermined portion of RAM in the storage 308. In this way, confidential information stored in the RAM is erased. The portions of RAM to be erased during normal boots may be programmed into the security code 310. Additionally, if the boot is a normal boot, the core may invalidate one or more lines of one or more caches 302, 304 and/or 306. The line(s) of the cache(s) that is invalidated preferably is predetermined and may be programmed into the security code 310. In this way, confidential information stored in the cache(s) may be deleted. Additionally, the security code 310 may cause the core 300 to ensure that the SUBTAPCTRLDISABLE pin 202 remains "HIGH" such that the JTAG interfaces 316 remains disabled, thereby preventing access to the IC 200 by a malicious entity via the JTAG interfaces 316. Any or all of these actions may be performed by the security code 310 upon detecting the occurrence of a normal boot.

Although the security measures described above are described as being implemented in response to a normal boot, the scope of this disclosure is not limited as such. The security code 310 may be programmed to implement the above-described software security measures in response to any type of boot. Further, the software security measures may be adjusted as desired depending on the architecture in which the software is implemented. For example, while in some embodiments the SUBTAPCTRLDISABLE pin 202 is kept "HIGH" to disable the JTAG interfaces 316, in other embodiments, any pin or circuit logic which disables the JTAG interfaces 316 may be adjusted.

In some embodiments, if the IC 200 is undergoing (or has undergone) a "test" boot, the ARM_BOOT_BRANCH register contains a "0x2" value or some other value which the security code 310 recognizes as indicative of a "test" boot. A test boot is any type of boot which allows the IC 200 to be booted securely. In such cases, the security code 310 causes the core 300 to erase the contents of at least a portion of the storage 308. For example, the core 300 may erase the contents of a predetermined portion of RAM in the storage 308. In this way, confidential information stored in the RAM may be erased. Additionally, the security code 310 may cause the core 300 to ensure that the SUBTAPCTRLDISABLE pin 202 remains "HIGH" such that the JTAG interfaces 316 remain disabled, thereby disabling access to the IC 200 via the JTAG interfaces 316. Additionally, the security code 310 may cause the core 300 to configure one or more secure memories in the storage 308 to be publicly accessible. For example, a hardware firewall may be adjusted so as to allow public mode accesses to the one or more secure memories. Additionally, the security code 310 may cause the core 300 to ensure that once the IC 200 has exited from the test boot mode, the test boot mode is not entered again until a cold reset of the IC 200 is performed. In this way, malicious entities who attempt to access several different test modes to attack the system from several different angles are prevented from doing so.

Although the security measures described above are described as being implemented in response to a test boot, the scope of this disclosure is not limited as such. The security code 310 may be programmed to implement the above-described software security measures in response to any specific type of boot. Further, the software security measures may be adjusted as desired depending on the architecture in which the software is implemented. For example, while in some embodiments the SUBTAPCTRLDISABLE pin 202 is kept "LOW" to enable the JTAG interfaces 316, in other embodiments, any pin or circuit logic which enables the JTAG interfaces 316 may be adjusted.

In some embodiments, if the IC 200 is undergoing (or has undergone) an "illegal" boot, the ARM_BOOT_BRANCH register contains a "0x1" or "0x3" value or some other value which the security code 310 recognizes are indicative of an "illegal" boot. An "illegal" boot may be defined as any suitable trash boot. For example, the IC 200 may be booting in scan mode, which may leave the IC 200 open to attack. In such cases, the security code 310 enters an infinite loop of code which cannot be stopped unless the IC 200 is reset or powered off. In this way, malicious entities are prevented from using such illegal boots to attack the system 100. In some embodiments, the security code 310 may be programmed to implement such preventative measures in boot types besides the illegal boot.

Figure 5:
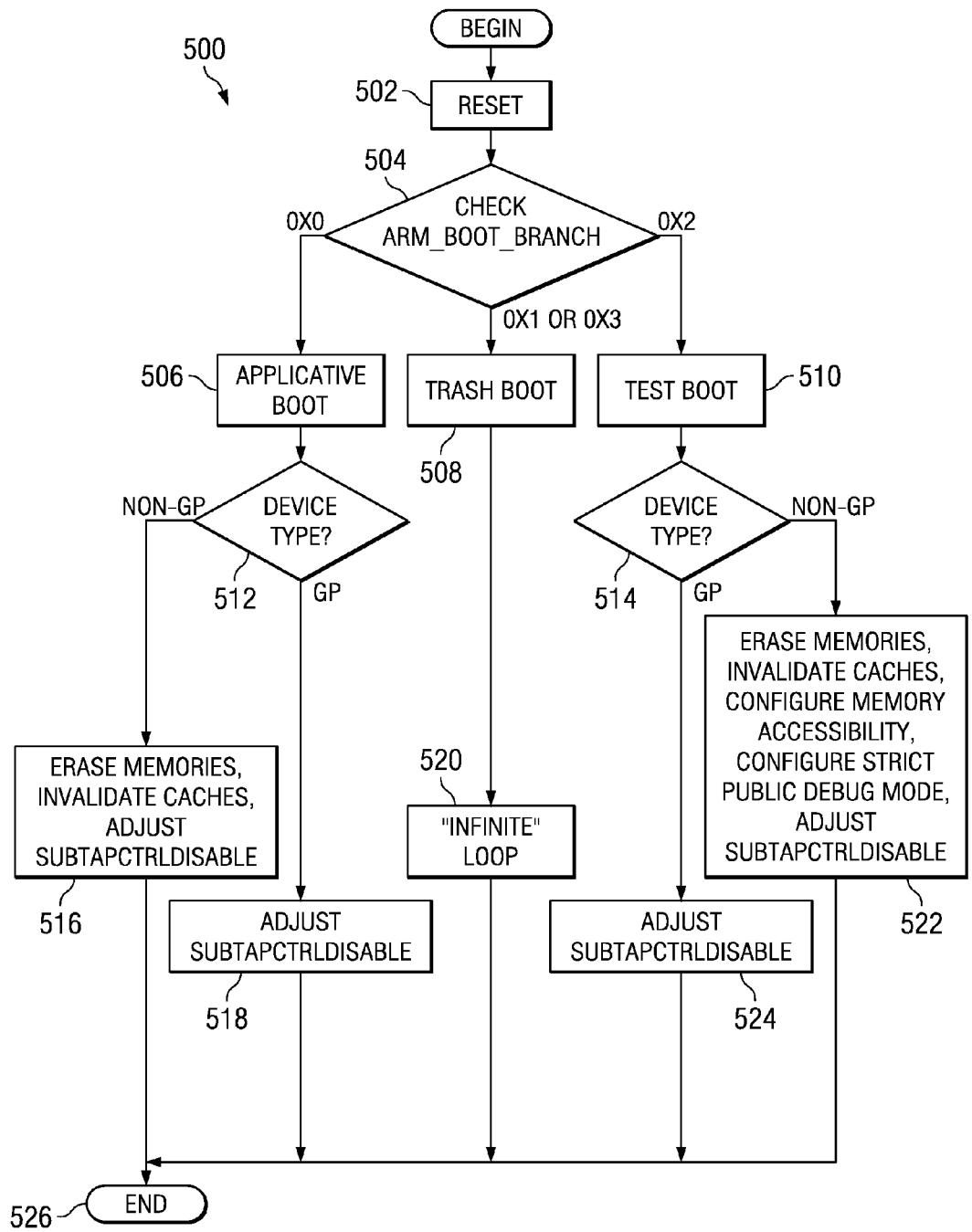
FIG. 5 shows a flow diagram of security techniques implemented by software stored on the IC of FIGS. 2 and 3, in accordance with embodiments of the invention.

FIG. 5 shows a flow diagram of a method 500 that may be used to implement the software security techniques described above. The method 500 begins by resetting and booting up the IC 200 (block 502) and determining the type of boot the IC 200 is performing (block 504). In at least some embodiments, determining the type of boot includes determining the contents of the ARM_BOOT_BRANCH register. If the boot is a "normal" boot (block 506) (e.g., in which the ARM_BOOT_BRANCH comprises "0x0"), the method 500 comprises determining the type of device being used (block 512). If a general purpose device is being used, the SUBTAPCTRLDISABLE is set such that the JTAG interface is enabled (block 518). Otherwise, the method 500 comprises erasing contents of one or more predetermined memories, invalidating one or more lines of one or more caches 304 or 306 and adjusting the SUBTAPCTRLDISABLE signal (block 516). In some embodiments, the SUBTAPCTRLDISABLE signal is set such that the JTAG interface is disabled. In other embodiments, the SUBTAPCTRLDISABLE signal is set such that the JTAG interface is enabled.

If the boot is a trash boot (block 508) (e.g., the ARM_BOOT_BRANCH register comprises "0x1" or "0x3"), the method 500 comprises executing an infinite loop whereby a malicious entity is precluded from accessing data stored on the IC 200 (block 520). The infinite loop does not cease being executed until the IC 200 is reset or powered off. If the boot is a test boot (block 510) (e.g., the ARM_BOOT_BRANCH register comprises "0x2"), the method 500 comprises determining the type of device type being used (block 514). If the device comprises a general purpose device, the method 500 comprises adjusting the SUBTAPCTRLDISABLE signal such that the JTAG interface is enabled (block 524). Otherwise, the method 500 comprises erasing contents of one or more predetermined memories, invalidating one or more lines of one or more caches 304 or 306, configuring one or more memories to be accessible in the public mode, configuring a public debug mode (e.g., a Strict Public Debug mode) and adjusting the SUBTAPCTRLDISABLE signal such that the JTAG interface is enabled (block 522). The method 500 is then complete (block 526).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    processing logic;
    an integrated circuit (IC) test interface coupled to the processing logic; and
    a storage coupled to the processing logic and configured to store security code executable by the processing logic, wherein the security code is configured to determine whether a type of boot performed by the system is a functional boot, a test boot, or a trash boot, to erase a predetermined portion of the storage, and to deactivate the IC test interface, when the type of boot is a functional boot.

2. The system of claim 1, wherein the security code is configured to activate the IC test interface only after the predetermined portion of the storage has been erased.

3. The system of claim 1, wherein the security code is configured to invalidate a cache if the type of boot is a functional boot.

4. The system of claim 1, wherein the security code is configured to execute an infinite loop of code when the type of boot is a trash boot.

5. The system of claim 1, wherein the storage comprises a secure memory, and wherein the security code is configured to configure the secure memory to be accessible in a public mode when the type of boot is a test boot.

6. The system of claim 1, wherein the IC test interface comprises a Joint Test Action Group (JTAG) interface.

7. The system of claim 1, wherein the processing logic is configured to perform a cold reset prior to at least one selected from a group consisting of switching from a functional mode to a test mode and switching from one test mode to another test mode.

8. A method implemented in a system comprising an integrated circuit (IC) test interface, the method comprising:
    determining whether a type of boot performed by the system is a functional boot, a test boot, or a trash boot; and
    when the type of boot is a functional boot, erasing a predetermined portion of a system storage and deactivating act the IC test interface.

9. The method of claim 8, wherein, the method further comprises executing an infinite loop of code which is exited only by resetting the system when the type of boot is a trash boot.

10. The method of claim 8 further comprising configuring a secure portion of the storage to be accessible in a public mode when the type of boot is a test boot.

11. The method of claim 8, wherein the IC test interface comprises a Joint Test Action Group (JTAG) interface.

12. The method of claim 8 further comprising servicing a request to switch test modes only after performing a cold reset of the system.

13. The method of claim 8, further comprising activating the IC test interface only after the predetermined portion of the system storage has been erased.

14. A system, comprising:
    means for determining whether a type of boot performed by the system is a functional boot, a test boot, or a trash boot; and
    means for erasing a predetermined portion of a system storage when the type of boot is a functional boot,
    wherein the means for erasing is also for deactivating an integrated circuit (IC) test interface when the type of boot is a functional boot.

15. The system of claim 14, wherein the means for erasing activates the IC test interface only after the means for erasing erases the predetermined portion of the system storage.

16. The system of claim 14, wherein, when the type of boot is a trash boot, the system enters a loop of code exited only with a cold reset of the system.

17. The system of claim 14, wherein the means for erasing configures a secure portion of the system storage to be accessible in a public mode when the type of boot is a test boot.

18. The system of claim 14, wherein the IC test interface comprises a Joint Test Action Group (JTAG) interface.

19. The system of claim 14, wherein the system performs a cold reset prior to servicing a request to switch between test modes.

20. The system of claim 14, wherein the system performs a cold reset between a time a test mode is exited and a time a test mode is re-entered.

* * * * *